(12) United States Patent
Duchenne et al.

(10) Patent No.: US 6,762,828 B1
(45) Date of Patent: Jul. 13, 2004

(54) ELECTROMAGNETIC PULSE TRAIN GENERATION FOR TESTING OPTICAL FIBERS

(75) Inventors: Bruno Duchenne, Saint Orens de Gameville (FR); Jacques Isbert, Toulouse (FR)

(73) Assignees: ONERA (Office National d'Etudes et de Recherches Aerospatiales), Chatillon (FR); Eads Airbus SA, Paris (FR)

( * ) Notice: Subject to any disclaimer, the term of this patent is extended or adjusted under 35 U.S.C. 154(b) by 0 days.

(21) Appl. No.: 09/806,343
(22) PCT Filed: Oct. 7, 1999
(86) PCT No.: PCT/FR99/02400
§ 371 (c)(1),
(2), (4) Date: Mar. 29, 2001
(87) PCT Pub. No.: WO00/22402
PCT Pub. Date: Apr. 20, 2000

(30) Foreign Application Priority Data
Oct. 8, 1998 (FR) .......................................... 98 12601

(51) Int. Cl.[7] .............................................. G01N 21/00
(52) U.S. Cl. ..................................................... 356/73.1
(58) Field of Search ................. 356/73.1; 398/141–148, 398/192, 119, 29, 81; 385/142–144, 123–127, 37, 12; 250/227.14, 227.12; 372/18–20, 101, 69, 102, 87, 11

(56) References Cited
U.S. PATENT DOCUMENTS 4,497,575 A   2/1985   Philipp
5,251,002 A   10/1993  Gryk

FOREIGN PATENT DOCUMENTS

| EP | 0184432 | 6/1986 |
|---|---|---|
| FR | 2622979 | 5/1989 |
| JP | 531042 | 1/1978 |

OTHER PUBLICATIONS

Cohen, L G. "Shuttle Pulse Measurements of Pulse Spreading in an Optical Fibre." *Applied Optics*. Jun. 1975, vol. 14, No. 6, pp. 1351–1356.

English translation of International Preliminary Examination Report.

*Primary Examiner*—Tu T. Nguyen
(74) *Attorney, Agent, or Firm*—Stevens, Davis, Miller, & Mosher, LLP

(57) ABSTRACT

An emitter for emitting electromagnetic pulses includes a generator for generating an electromagnetic pulse, an optical fiber that transmits the eletromagnetic pulse, and an optical cavity. The optical cavity is placed in the path of the incident electromagnetic pulse transmitted by the optical fiber and has an input provided with a first partially reflecting mirror and an output provided with a second partially reflecting mirror. The first partially reflecting mirror is placed between first and second fiber lengths of the optical fiber and the second partially reflecting mirror is placed between the second and a third fiber length of the optical fiber. The length of the second fiber and a transmission/reflection ratio of the first and second mirrors are adjusted such that a train of electromagnetic pulses, having variable geometry characteristics, is emitted.

10 Claims, 3 Drawing Sheets

ELECTROMAGNETIC PULSE TRAIN GENERATION FOR TESTING OPTICAL FIBERS

FIELD OF THE INVENTION

The present invention relates to an emitter for emitting electromagnetic pulses, to a system for testing fiber-optic components and to a method of testing them.

BACKGROUND OF THE INVENTION

Said emitter, of the type comprising:
- a generator for generating at least one electromagnetic pulse, especially a light pulse; and
- at least one optical fiber capable of transmitting an electromagnetic pulse generated by said generator for the purpose of injecting it, is able to be applied more particularly, although not exclusively, to a test system for determining characteristic parameters, especially the losses, of a fiber-optic component, in particular a fiber-based component, a fiber-based link or a fiber-optic network.

U.S. Pat. No. 5,251,002 discloses such a test system, which comprises:
- such an optical emitter or source capable of emitting a light pulse;
- a photoreceiver capable of measuring optical characteristics of a light pulse emitted by said optical source and transmitted by a fiber-optic component; and
- data acquisition, storage and processing means which receive the measurements generated by said photoreceiver for said fiber-optic component to be tested and for a reference fiber-optic component and which determine, on the basis of these measurements, the losses of said fiber-optic component to be tested.

In a known manner, said optical source or said emitter has emission conditions, especially with regard to the emission solid angle and the illumination surface, which are fixed and uniform.

In addition, said known test system allows tests to be carried out only for a defined configuration of the light beam used, as emitted by said optical source. This known test system therefore uses a method which measures only the losses relative to a single defined pulse emitted by said optical source.

However, in practice, the configuration of the light beam generated by the optical source is not always that actually used in said optical component to be tested. Consequently, the reliability of this test system is unsatisfactory.

To increase the reliability, it is necessary to suitably sample the aforementioned illumination or emission conditions, which may vary from 0% to 100% of the area of the core in the case of the emission surface, and from 0% to 100% of the numerical aperture, in the case of the emission solid angle. In the situations usually encountered, the conditions may vary from 70% to 100%.

For this purpose, it is advised to provide a sampling increment of at most 2%. This therefore assumes that at least some fifteen different optical sources are used, each of which has appropriate illumination conditions, in order to obtain satisfactory sampling.

This solution is therefore hardly satisfactory, especially because of the high cost, the lengthy implementation time and the considerable amount of handling.

SUMMARY OF THE INVENTION

It is an object of the present invention to remedy these drawbacks, and especially those associated with the existence of fixed and uniform emission conditions of the optical source.

It relates to an emitter for emitting electromagnetic pulses, which is capable of emitting electromagnetic pulses having emission geometry characteristics (emission solid angle and emission area) which are variable.

For this purpose, according to the invention, said emitter for emitting electromagnetic pulses, comprising:
- a generator for generating at least one electromagnetic pulse; and
- at least one optical fiber capable of transmitting an electromagnetic pulse generated by said generator for the purpose of emitting it, is noteworthy in that it includes in addition at least one optical cavity:
- which is placed in the path of an incident electromagnetic pulse transmitted by said optical fiber; and
- which has an input provided with a first partially reflecting mirror and an output provided with a second partially reflecting mirror, said first and second mirrors being arranged so as to create at the output of said optical cavity, from a single incident electromagnetic pulse, a train of emitted electromagnetic pulses which have variable geometry characteristics and are associated with said incident electromagnetic pulse.

Thus, by virtue of said optical cavity, the emitted pulse train comprises pulses subjected to variable numbers of reflections off said mirrors and therefore traveling variable distances in said cavity. However, since the aforementioned geometry characteristics vary, in a known manner, according to the distance traveled, the various pulses of said pulse train have variable geometry characteristics (emission solid angle and emission area).

Consequently, by choosing appropriate characteristics of said optical cavity, and especially the reflection/transmission ratio of the partially reflecting mirrors and the distance between them, a plurality of pulses having predetermined emission characteristics can be formed.

In particular, when said emitter is applied to a test system of the aforementioned type, it is possible to form a particular pulse train comprising the various possible configurations of the light beams likely to be transmitted by the component to be tested.

This enables the aforementioned drawbacks of the known test system, described in particular in U.S. Pat. No. 5,251,002, to be remedied since it is no longer necessary to provide a plurality of different optical sources in order to carry out an overall test.

Moreover, advantageously, at least one of said first and second mirrors is linked to two lengths of the optical fiber:
- in a first embodiment, directly by opposed faces; and
- in a second embodiment, via an associated optical coupling means.

In this second embodiment, said or each of said optical coupling means advantageously comprises:
- in a first embodiment, two lenses optically linking said two lengths of the optical fiber, the mirror associated with said optical coupling means being placed between said lenses;
- in a second embodiment, a single half-wave graded-index lens, said mirror being placed on that face of said optical coupling means which is internal to said optical cavity; and
- in a third embodiment, two quarter-wave graded-index lenses optically linking said two lengths of the optical fiber, the mirror associated with said optical coupling means being placed between said lenses.

Moreover, the emitter according to the invention advantageously comprises means preventing a pulse generated by said generator from returning toward the latter. For this purpose, said means preferably include at least one light trap which cooperates with the optical coupling means associated with said first mirror.

Furthermore, said generator is advantageously capable of generating at least two pulses, of different wavelengths, thereby making it possible in particular, when applying it to a test system, to measure simultaneously the losses at several operating wavelengths of certain types of links such as, for example, video communication links operating at wavelengths of 0.85 $\mu$m and 1.3 $\mu$m.

The present invention also relates to a test system of the aforementioned type.

According to the invention, said test system is noteworthy in that the optical source of this system comprises a light-pulse emitter, as mentioned above.

In addition to the advantages indicated above, this test system according to the invention has an operating life (or lifetime) longer than that described in U.S. Pat. No. 5,251,002. This is because this known latter system, which includes electrooptic switches, only allows a relatively small number of uses and, in addition, it is sensitive to the environmental conditions, something which is not the case in the system according to the invention, which has no mechanical moving parts.

It should also be noted that the optical fiber of the pulse emitter generally has characteristics (core diameter and numerical aperture) identical to those of the fiber-optic component to be tested. This makes it possible to vary over time, in the same direction, the emission area and the emission solid angle, these latter two geometry characteristics decreasing for each successive pulse.

However, in one particular embodiment, the electromagnetic pulse emitter is formed in such a way that one of said geometry characteristics is constant and the other varies.

For this purpose, according to the invention:

in order to obtain a constant emission solid angle, an optical fiber is provided which has the same core diameter as the core diameter of the fiber-optic component to be tested, but with a larger numerical aperture; and in order to obtain a constant emission area, an optical fiber is provided which has the same numerical aperture, but a larger core diameter than the component to be tested.

Moreover, the present invention also relates to a test method for determining the value of at least one characteristic parameter, such as the attenuation of the electromagnetic intensity, of a fiber-optic component, which method makes it possible in particular to remedy the aforementioned drawbacks of the known method implemented by the test system described in U.S. Pat. No. 5,251,002.

This known method, as indicated above, takes measurements for only a single type of pulse. Thus, when information is needed for a plurality of different pulses, it is necessary to use said known method for each of said pulses. In addition, to be able to adapt or compare the results then obtained, it is necessary to create the same operating conditions for each of these different tests. This is time-consuming, tedious and a source of errors.

In order to remedy these drawbacks, said method according to the invention for determining the value of at least one characteristic parameter of a fiber-optic component, in which method:

a) at least one electromagnetic pulse is generated, which is injected into said fiber-optic component;

b) measurements relating to said electromagnetic pulse transmitted by said fiber-optic component are carried out; and c) said characteristic parameter is determined at least from said measurements, is noteworthy in that, in step a), an electromagnetic pulse train is generated, at least some of the electromagnetic pulses of which have different values for at least one optical characteristic, especially an emission geometry characteristic such as the emission area or the emission solid angle, and in that, in step c), the value of said characteristic parameter is determined for each of said different electromagnetic pulses of said pulse train.

Thus, thanks to the invention, tests for a plurality of different pulses are carried out in a single implementation of the method. This has a number of advantages, and especially a reduction in the length and the cost of the tests when these have to be carried out for a plurality of different pulses, and an increase in the accuracy, since it is no longer necessary to try to recreate identical operating conditions for a plurality of different tests.

Advantageously, in order to generate said pulse train:

a plurality of pulses is formed from one incident electromagnetic pulse; and said pulses are made to travel different distances in at least one optical fiber, said pulses forming said pulse train at the exit of said optical fiber.

This is preferably carried out using the aforementioned emitter and in accordance with the invention.

In addition, said characteristic parameter advantageously represents the losses of said fiber-optic component and, in step b), measurements are carried out on said fiber-optic component and on a reference fiber-optic component.

BRIEF DESCRIPTION OF THE DRAWINGS

The figures of the appended drawing will clearly explain how the invention can be realized. In these figures, identical references denote similar components.

DETAILED DESCRIPTION OF THE INVENTION

Figure 1:
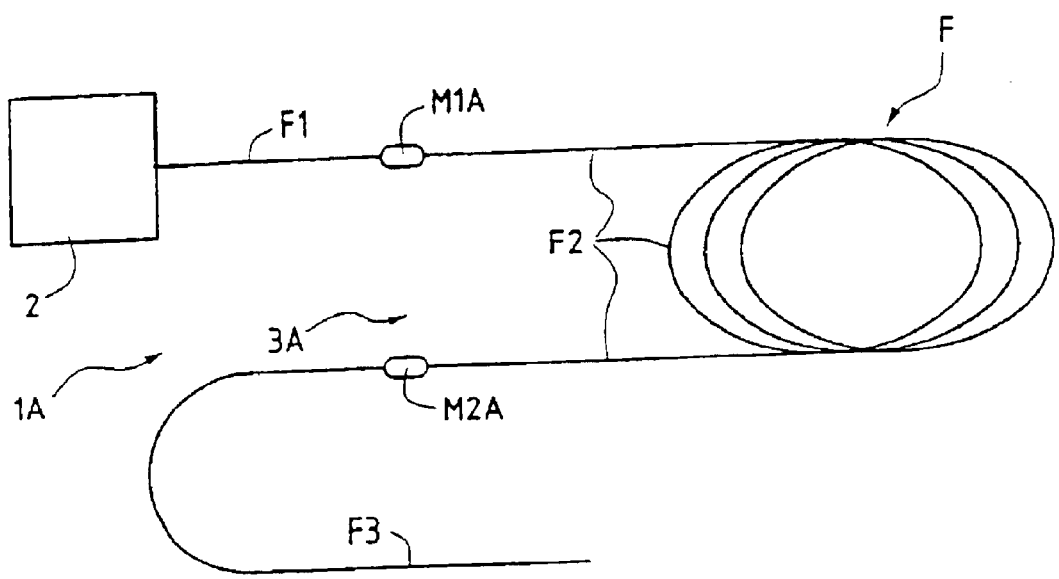
FIG. 1 shows an emitter according to the invention.

The emitter 1A, 1B, 1C and 1D according to the invention, shown in FIGS. 1 to 4 respectively, is intended to emit electromagnetic pulses, in this case light pulses.

Said emitter 1A to 1D is of the type comprising:

a generator 2, for example a light-emitting diode, a laser diode or a superluminescent diode, capable of generating a light pulse; and an optical fiber F linked to the generator 2 and capable of transmitting a light pulse generated by said generator 2 for the purpose of emitting it.

The emission geometry characteristics of this generator 2 are, in a known manner, fixed and uniform with regard to the emission solid angle and the emission area.

According to the invention, in order to obtain variable geometry characteristics, said emitter 1A to 1D also includes an optical cavity 3A to 3D.

Each of said optical cavities 3A to 3D comprises:

a first mirror, of the partially reflecting type, M1A, M1B, M1C and M1D respectively, which is placed between two lengths F1 and F2 of the optical fiber F, said length F1 being linked to the generator 2 in a known manner;

a second mirror, M2A, M2B, M2C and M2D respectively, which may be of the same type as said first mirror and is placed between the length F2 and a length F3 of the optical fiber F; and said length F2 being used to link said first and second mirrors together.

Thus, a light pulse which is generated by the generator 2 and enters the optical cavity 3A to 3D is partially transmitted by the mirror M2A to M2D and partially reflected by the latter, the reflected part then also being partially reflected by the mirror M1A to M1D so as to return to said mirror M2A to M2D where it is again partially reflected and partially transmitted, and so on. This makes it possible to produce at the output of the optical cavity 3A to 3D a train of temporally shifted pulses.

Each of said pulses in the length F2 has therefore traveled a path of different length.

Now, theory [S. D. Personick, Bell Syst. Tech. J. 50, 843, (1971)], confirmed by experimentation, demonstrates that the conditions for propagation of a light wave in an optical fiber vary depending on the length of the fiber, in this case the length F2. This variation (temporal broadening of the injected pulse or variation in the geometry, namely the core diameter and numerical aperture associated with the solid angle) is a variation depending on the length up to a fiber length defined as the modal equilibrium length, and above this the variation in the pulse broadening depends on the square root of the length and the geometry is constant. This modal equilibrium state is reached when the light mixed in one mode is statistically compensated for by the light which leaks therefrom.

As a consequence, the various pulses of the pulse train emitted by the emitter 1A to 1D have variable emission geometry characteristics.

Thus, by suitably choosing the optical cavity 3A to 3D, especially with regard to the length of the fiber length F2 and the transmission/reflection ratio of said first and second mirrors, it is possible to define precisely the geometry characteristics of the various pulses emitted and thus obtain, thanks to the invention, from a single pulse generated by the generator 2, a train of variable and precisely defined pulses.

It will be noted that the generation by an optical cavity of length 1, from an injected pulse, of a pulse train makes it possible to obtain, for the output pulse of rank N, the propagation equivalent (modal dispersion, chromatic dispersion, change in geometry) in a fiber of length 1 (2N−1).

As an example, the emitter 1A to 1D according to the invention can be used to emit a pulse train generating some fifteen different emission characteristics, between the following limits:

70% to 100% of the numerical aperture of an illuminated optical fiber; and

70% to 100% of the core diameter of said illuminated optical fiber.

Figure 2:
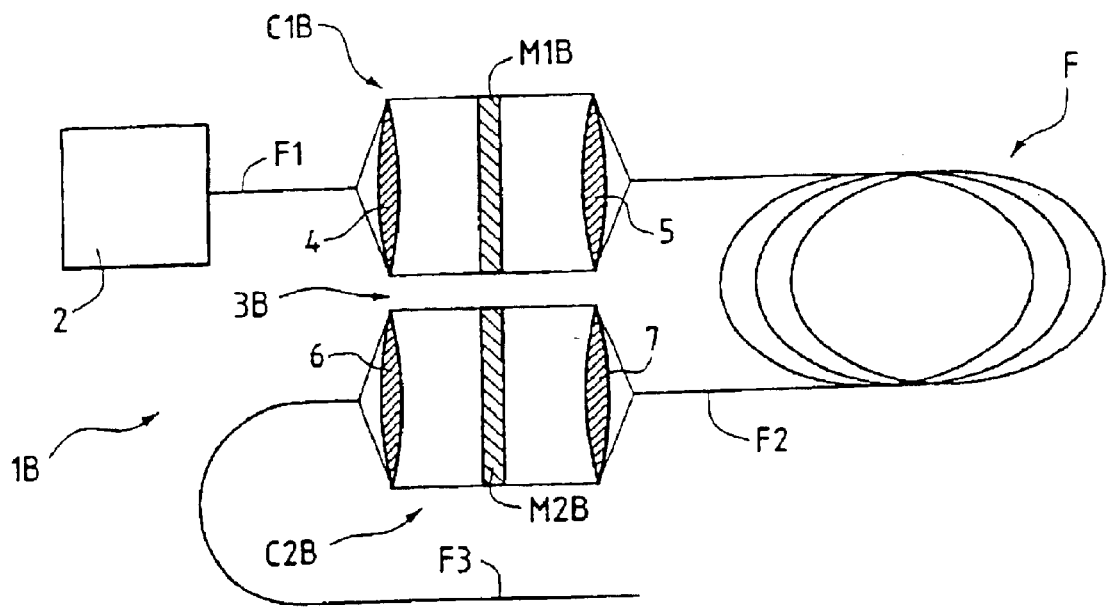
FIGS. 2, 3, and 4 show, schematically and non-exhaustively, three different embodiments of an emitter according to the invention, respectively.

In the embodiment shown in FIG. 1, the mirrors M1A and M2A each have a layer of partially reflecting material which is deposited directly on a length of the optical fiber F and the adjacent lengths are bonded together, whereas in the embodiments shown in FIGS. 2 to 4 the mirrors M1B, M2B, M1C, M2C, M1D and M2D are coupled, respectively, to optical coupling means C1B, C2B, C1C, C2C, C1D and C2D which are explained below, As may be seen in FIG. 2, the coupling means C1B and C2B each comprise two lenses 4, 5 and 6, 7, for example spherical or aspherical lenses, between which the corresponding mirror M1B, M2B is placed.

In addition, the lens 4 is linked to the length F1, the lenses 5 and 7 are linked to the length F2 and the lens 6 is linked to the length F3, in a known manner.

Figure 3:
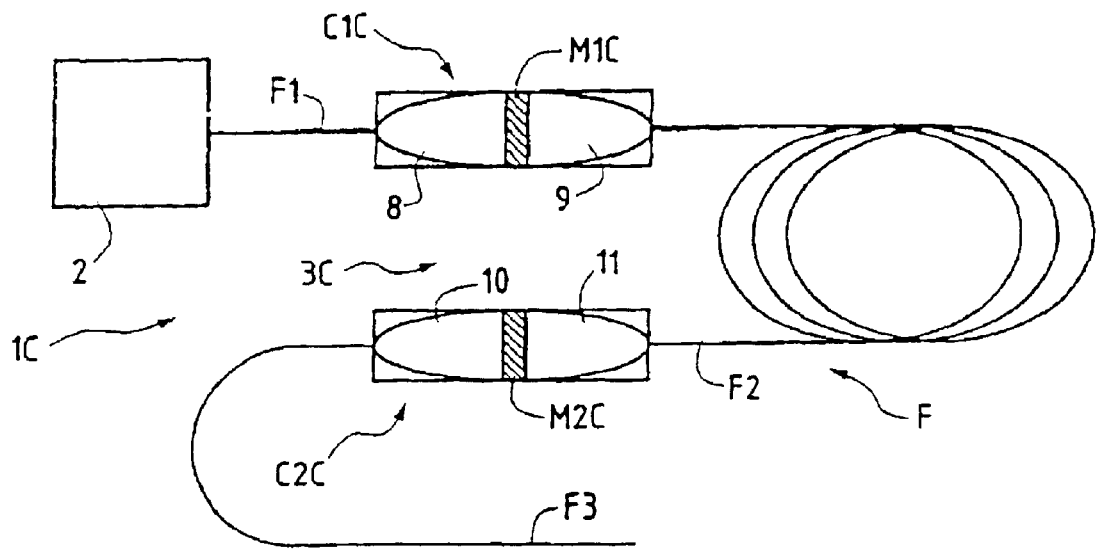

Furthermore, the optical coupling means C1C and C2C each comprise two lenses 8, 9 and 10, 11 of the quarter-wave graded-index type, these being linked to the lengths F1 to F3 of the optical fiber F and between which lenses the corresponding mirror M1C, M2C is placed, as shown in FIG. 3.

Figure 4:
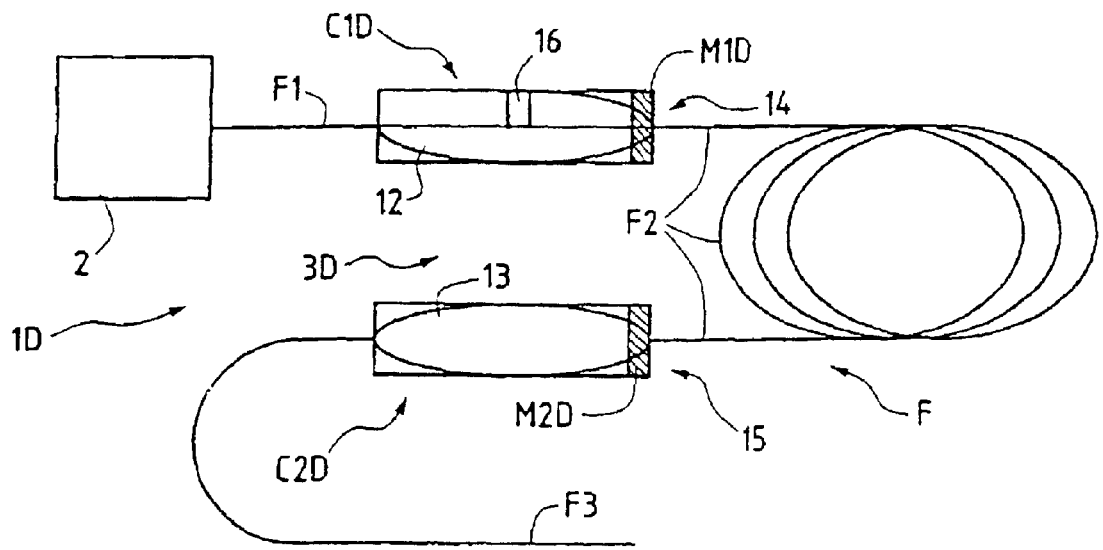

As regards the optical coupling means C1D and C2D shown in FIG. 4, these each comprise a lens 12, 13 of the half-wave graded-index type and the corresponding mirrors M1D and M2D are placed on those faces 14 and 15 of said optical coupling means C1D and C2D which are internal to the optical cavity 3D.

In addition, said means C1D includes a light trap 16 intended to eliminate the light reflected by the mirror M1D and therefore to prevent a pulse emitted by the generator 2, or part of this pulse, from returning to the generator. Of course, such a light trap may be provided in the various possible embodiments.

Furthermore, it will be noted that, according to the invention:

the techniques of alignment and of mounting the lengths of optical fiber and the coupling means may be of any known type;

the deposition of the reflecting layers of the mirrors may be carried out either on both ends of the fiber F2 of the optical cavity, or on the coupling means;

the length of the optical fiber F2 of the optical cavity may be chosen within a wide range of values. By way of example, this length may be 50 meters;

the emitter 1A to 1D applies to any type of multimode optical fiber F, whatever its core diameter and cladding diameter, and whatever the material (silica, silicone, polymer) used to make it; and said emitter 1A to 1D has no mechanical moving parts, which are a source of failure.

It should also be noted that many applications of the aforementioned emitter 1A to 1D are possible, especially for taking measurements, and in particular for measuring various characteristic parameters such as:

the attenuation of fiber-optic components or harnesses or of multimode fiber networks;

the mode transfer function of fiber-optic components or harnesses;

the error rate of a fiber-optic link; or the bandwidth of a multimode optical fiber.

For this purpose, the present invention also relates to a method for measuring such a characteristic parameter of a fiber-optic component, and especially the losses in it.

More specifically, it relates to a method in which:

a) at least one electromagnetic pulse, especially a light pulse, is generated, which is injected into said fiber-optic component;

b) measurements relating to said electromagnetic pulse transmitted by said fiber-optic component are carried out; and c) said characteristic parameter is determined at least from said measurements.

According to the invention, in step a), an electromagnetic pulse train is generated, at least some of the electromagnetic pulses of which have different values for at least one optical characteristic, especially an emission geometry characteristic, and, in step c), the value of said characteristic parameter is determined for each of said different electromagnetic pulses of said pulse train.

Figure 5:
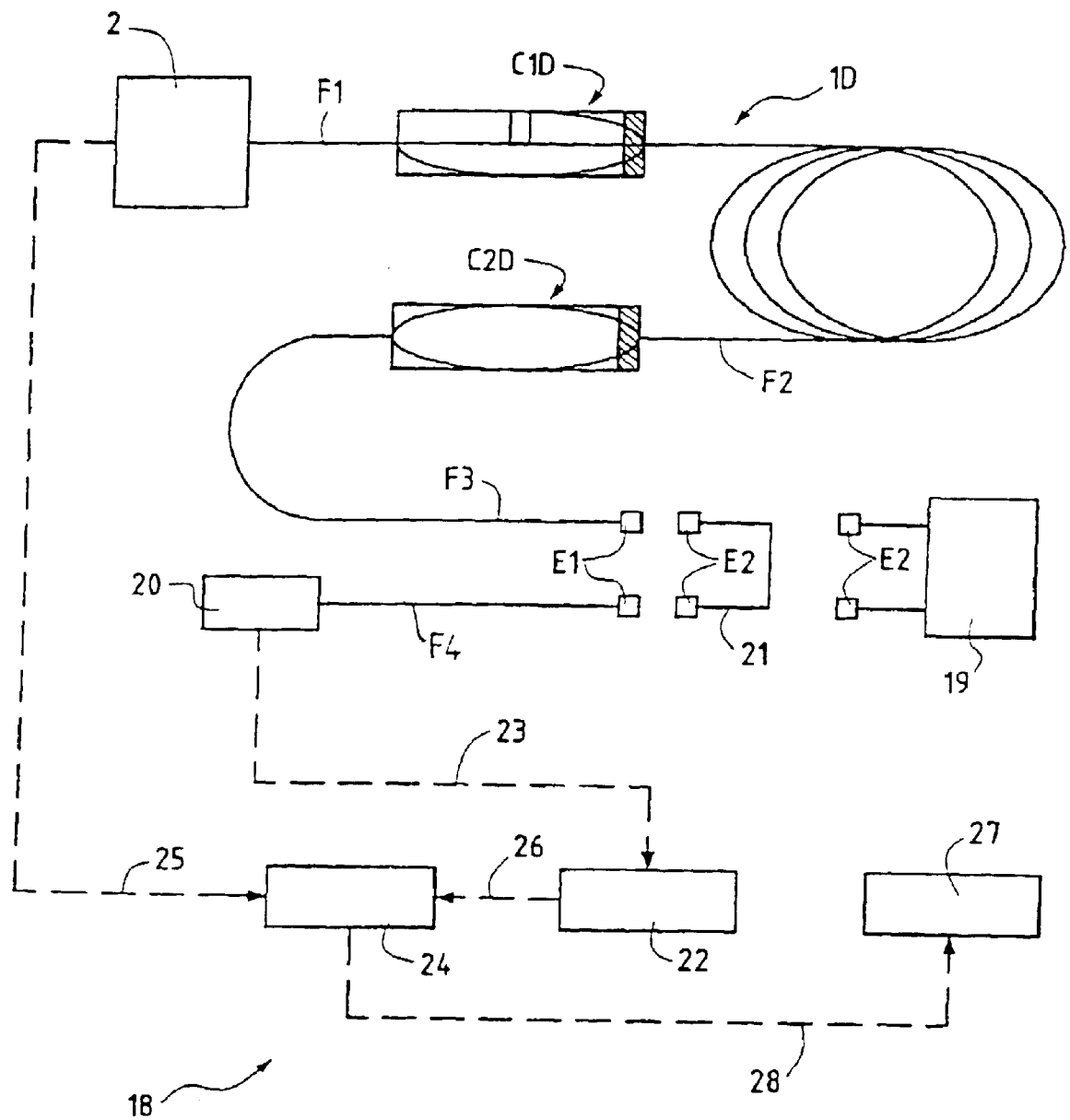
FIG. 5 shows, schematically, a test system according to the invention for testing a fiber-optic component.

FIG. 5 shows a test system 18 according to the invention, which allows the aforementioned method to be implemented and which is intended to determine the losses of a fiber-optic component 19, for example a fiber component, a fiber link or a fiber-optic network.

For this purpose, said system 18 comprises, according to the invention:

- a light pulse emitter as mentioned above, according to the invention and corresponding in this case, by way of example, to that of the embodiment 1D in FIG. 4;
- a photoreceiver 20 of known type, for example a PIN photodiode or an APD photodiode, capable of measuring characteristics such as the intensity of a light pulse which is emitted by said emitter 1D and which is transmitted by a fiber-optic component 19 or 21;
- means 22, for example a memory, linked by an electrical link 23 to the photoreceiver 20 and intended to record the measurements made by said photoreceiver 20; and
- means 24 linked via electrical links 25 and 26 to the generator 2 and to the means 22, respectively, and determining, from the measurements received and carried out by the photoreceiver 20, on the one hand for said component 19 to be tested and, on the other hand, for a reference component 21, for example a single optical fiber of short length, the losses of said component 19.

The results of the tests thus carried out may be displayed by means 27 linked via an electrical link 28 to said means 24.

In order to carry out the measurements, the components 19 and 21 may be linked to the length F3 and to a length F4 (joined to the photoreceiver 20) of the optical fiber, via known means E1, E2, acting together and forming, for example, a universal socket.

The length F3 and the component 19 have the same core diameter and the same numerical aperture. However, within the context of the present invention, one of these characteristics may also differ from one component to another, in order to obtain simultaneously a constant geometry characteristic (for example, the emission area) and a variable geometry characteristic (for example, the emission solid angle).

What is claimed is:

1. An emitter for emitting electromagnetic pulses, comprising:
   a generator that generates at least one electromagnetic pulse;
   at least one optical fiber that transmits said electromagnetic pulse generated by said generator for the purpose of emitting said electromagnetic pulse; and
   an optical system including an optical cavity:
      which is disposed in a path of said electromagnetic pulse transmitted by said optical fiber; and
      which has an input provided with a first partially reflecting mirror and an output provided with a second partially reflecting mirror, wherein:
   said first partially reflecting mirror is placed between a first fiber length and a second fiber length of the optical fiber, said first fiber length being linked to the generator,
   said second partially reflecting mirror is placed between the second fiber length and a third fiber length of the optical fiber, said second fiber length being used to link said first and second mirrors together, and
   the length of said second fiber length and the transmission and reflection ratio of said first and second mirrors are adjusted such that, there is created at the output of said optical cavity, from a single said electromagnetic pulse incident on said optical cavity, a train of emitted electromagnetic pulses which have variable emission solid angles and variable emission areas and are associated with said incident electromagnetic pulse.

2. The emitter as claimed in claim 1, wherein at least one of said first and second mirrors is linked directly by opposed faces to two of said lengths of said optical fiber.

3. The emitter as claimed in claim 1, wherein at least one of said first and second mirrors is linked, via an associated optical coupler, to two of said lengths of said optical fiber.

4. The emitter as claimed in claim 3, wherein said optical coupler comprises two lenses optically linking said two of said lengths of the optical fiber, the mirror associated with said optical coupler being placed between said two lenses.

5. The emitter as claimed in claim 3, wherein said optical coupler comprises at least one graded-index lens.

6. The emitter as claimed in claim 1, further comprising an optical element that prevents an electromagnetic pulse generated by said generator from returning toward said generator.

7. The emitter as claimed in claim 1, wherein said generator is operable to generate at least two electromagnetic pulses, of different wavelengths.

8. A test system for determining the losses of a fiber-optic component, said system comprising:
   an optical source operable to emit at least one electromagnetic pulse;
   a photoreceiver operable to measure characteristics of said electromagnetic pulse emitted by said optical source and transmitted by said fiber-optic component; and
   a data acquisition, storage and processing device which receives the measurements generated by said photoreceiver for said fiber-optic component to be tested and for a reference fiber-optic component and which determines, on the basis of these measurements, the losses of said fiber-optic component to be tested, wherein:
   said optical source comprises an emitter including:
      a generator that generates at least one electromagnetic pulse;
      at least one optical fiber that transmits an said electromagnetic pulse generated by said generator for the purpose of emitting said electromagnetic pulse; and
      an optical system including an optical cavity:
         which is disposed in a path of said electromagnetic pulse transmitted by said optical fiber; and
         which has an input provided with a first partially reflecting mirror and an output provided with a second partially reflecting mirror, wherein:
      said first partially reflecting mirror is placed between a first fiber length and a second fiber length of the optical fiber, said first fiber length being linked to the generator,
      said second partially reflecting mirror is placed between the second fiber length and a third fiber length of the optical fiber, said second fiber length being used to link said first and second mirrors together, and
      the length of said second fiber length and the transmission and reflection ratio of said first and second mirrors are adjusted such that, there is created at the output of said optical cavity, from a single said electromagnetic pulse incident on said optical cavity, a train of emitted electromagnetic pulses which have variable emission solid angles and variable emission areas and are associated with said incident electromagnetic pulse.

9. The test system as claimed in claim 8, wherein the optical fiber of the emitter for emitting electromagnetic pulses has at least two characteristics, the core diameter and the numerical aperture, which are predetermined and in that at least one of said characteristics of said optical fiber is identical to that of the fiber-optic component to be tested.

10. A method of determining the value of at least one characteristic parameter of a fiber-optic component using an emitter that includes a generator that generates at least one electromagnetic pulse, at least one optical fiber that transmits said electromagnetic pulse generated by said generator for the purpose of emitting said electromagnetic pulse, and an optical system including an optical cavity which is disposed in a path of said electromagnetic pulse transmitted by said optical fiber and which has an input provided with a first partially reflecting mirror and an output provided with a second partially reflecting mirror, wherein said first partially reflecting mirror is placed between a first fiber length and a second fiber length of the optical fiber, said first fiber length being linked to the generator, said second partially reflecting mirror is placed between the second fiber length and a third fiber length of the optical fiber, said second fiber length being used to link said first and second mirrors together, and the length of said second fiber length and the transmission and reflection ratio of said first and second mirrors are adjusted such that, there is created at the output of said optical cavity, from a single said electromagnetic pulse incident on said optical cavity, a train of emitted electromagnetic pulses which have variable emission solid angles and variable emission areas and are associated with said incident electromagnetic pulse said method comprising:

a) emitting at least one electromagnetic pulse into said fiber-optic component;

b) carrying out measurements relating to said at least one electromagnetic pulse transmitted by said fiber-optic component; and c) determining said characteristic parameter at least from said measurements, wherein, in stop a), an electromagnetic pulse train is generated by means of said emitter, at least some of the electromagnetic pulses of which have different values for at least one optical characteristic, and in step c), the value of said characteristic parameter is determined for each of said different electromagnetic pulses of said pulse train.

* * * * *